July 15, 1952 — R. LAPSLEY — 2,603,326
CLUTCH CONSTRUCTION
Filed Sept. 22, 1948 — 4 Sheets-Sheet 1

INVENTOR.
ROBERT LAPSLEY
BY Walter E. Schirmer
ATTY.

July 15, 1952 R. LAPSLEY 2,603,326
CLUTCH CONSTRUCTION
Filed Sept. 22, 1948 4 Sheets-Sheet 3

INVENTOR.
ROBERT LAPSLEY
BY Walter E. Schirmer
ATTY.

July 15, 1952 R. LAPSLEY 2,603,326
CLUTCH CONSTRUCTION
Filed Sept. 22, 1948 4 Sheets-Sheet 4

INVENTOR.
ROBERT LAPSLEY
BY Walter E. Schirmer
ATTY.

Patented July 15, 1952

2,603,326

UNITED STATES PATENT OFFICE 2,603,326

CLUTCH CONSTRUCTION

Robert Lapsley, Berrien Springs, Mich., assignor to Clark Equipment Company, Buchanan, Mich., a corporation of Michigan Application September 22, 1948, Serial No. 50,633

6 Claims. (Cl. 192—68)

This invention is directed to clutch construction and is particularly concerned with clutch constructions in which means is provided for removing the clutch mechanism without disassembling the transmission from the clutch.

The present invention is directed, in its broader aspects, to power unit constructions embodying a clutch interposed between the engine and the transmission in such closely coupled units that it is impossible to remove the clutch or transmission axially without tearing down the entire vehicle. Such constructions are encountered in industrial equipment such as industrial trucks and the like, as well as in certain types of off-the-highway and other power operated pieces of equipment where the engine, clutch, transmission and axle mechanisms are all coupled together in a more or less rigid unit.

One of the primary objects of the present invention is to provide a construction which allows removal of the clutch vertically out of the clutch housing without requiring disassembly of either the transmission or engine housings from the clutch housing.

Another object of the present invention is to provide a clutch mechanism employing a quill shaft operable within the clutch housing to allow vertical removal of the clutch assembly together with the clutch operating mechanism by removal of the upper half of the clutch housing.

A further object of the present invention is to provide such clutch disassembling means for removal of the clutch which will not interfere with the bearing mounting for the clutch pinion shaft or the mounting in the flywheel housing for the input shaft.

Other objects and advantages of the present invention will appear more fully from the following detailed description, which, taken in conjunction with the accompanying drawings, will disclose to those skilled in the art, the particular construction and operation of a preferred form of the present invention.

Figure 1:
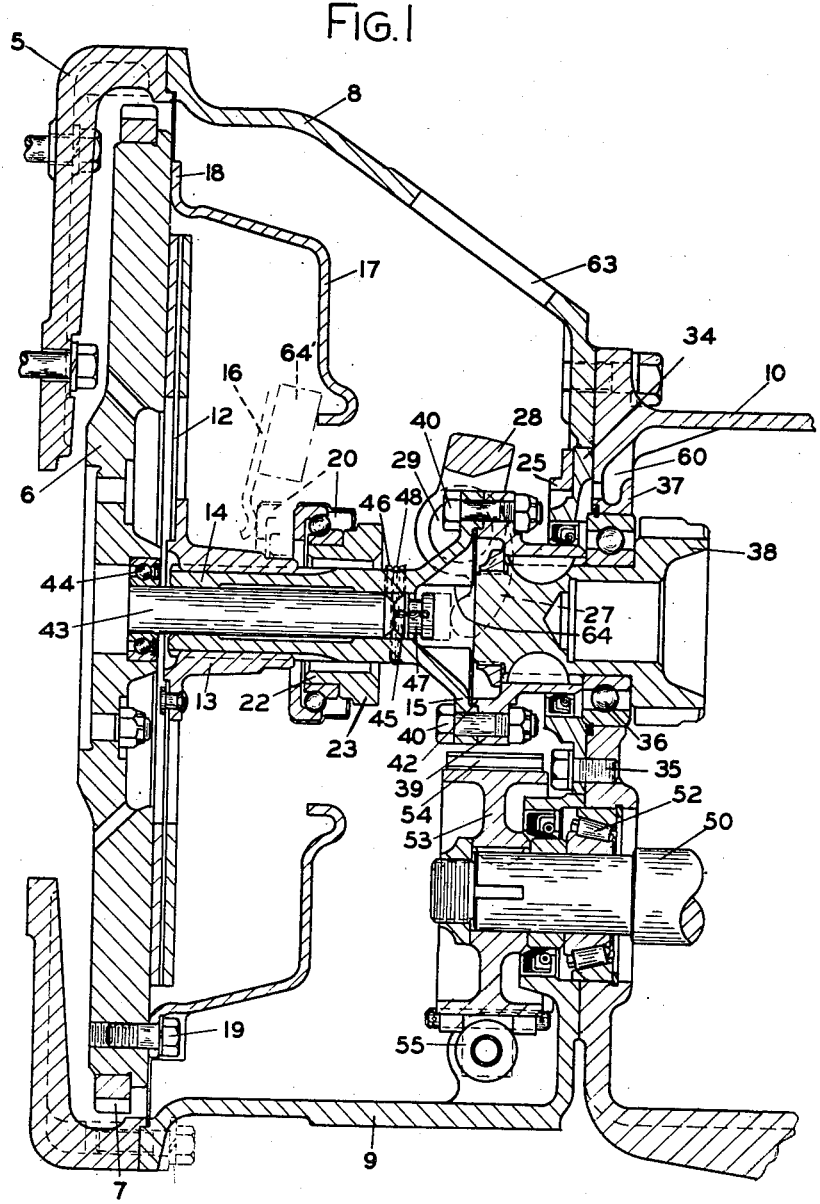
Figure 1 is a vertical sectional view through a clutch mechanism embodying the present invention.
Figure 3:
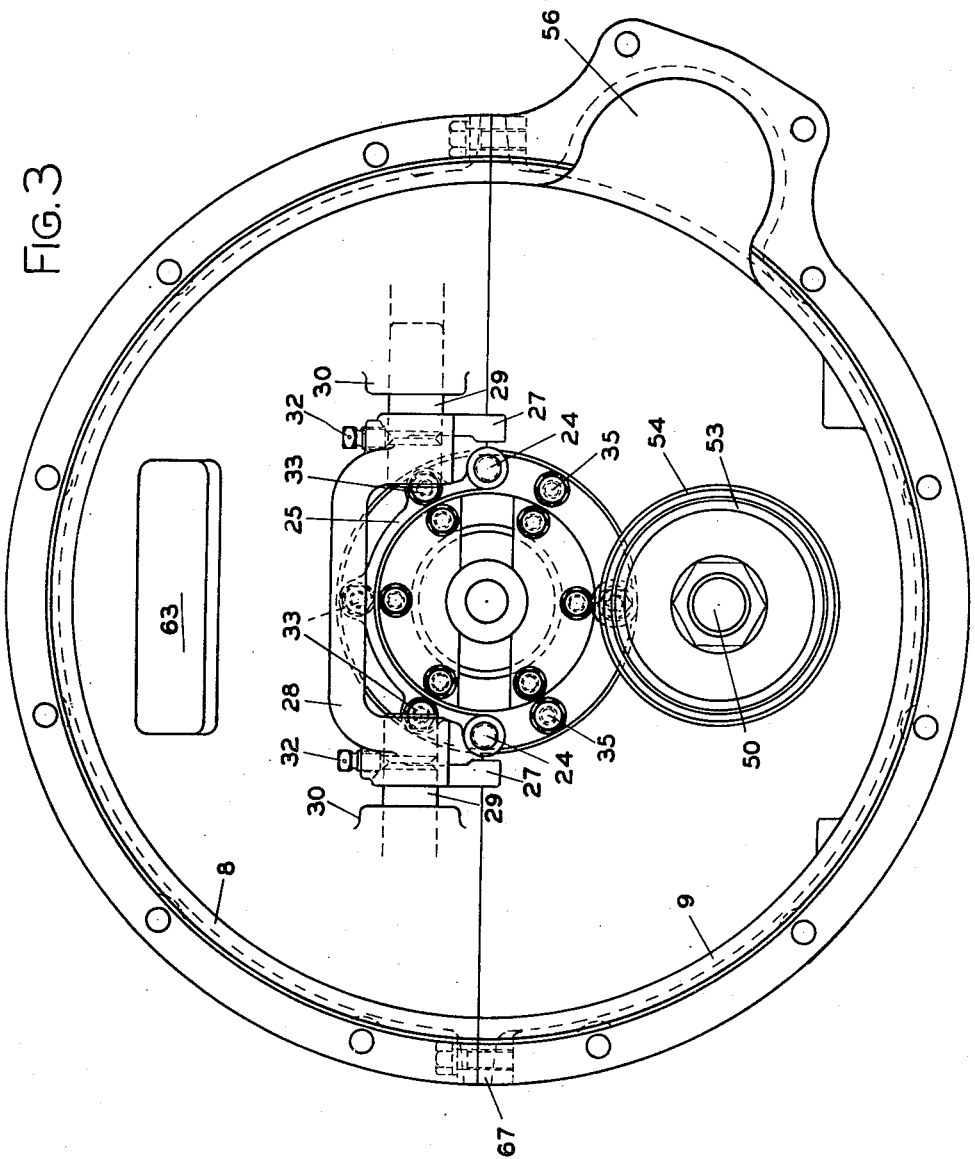
Figure 3 is a front end elevational view of the clutch housing and clutch operating mechanism.
Figure 4:
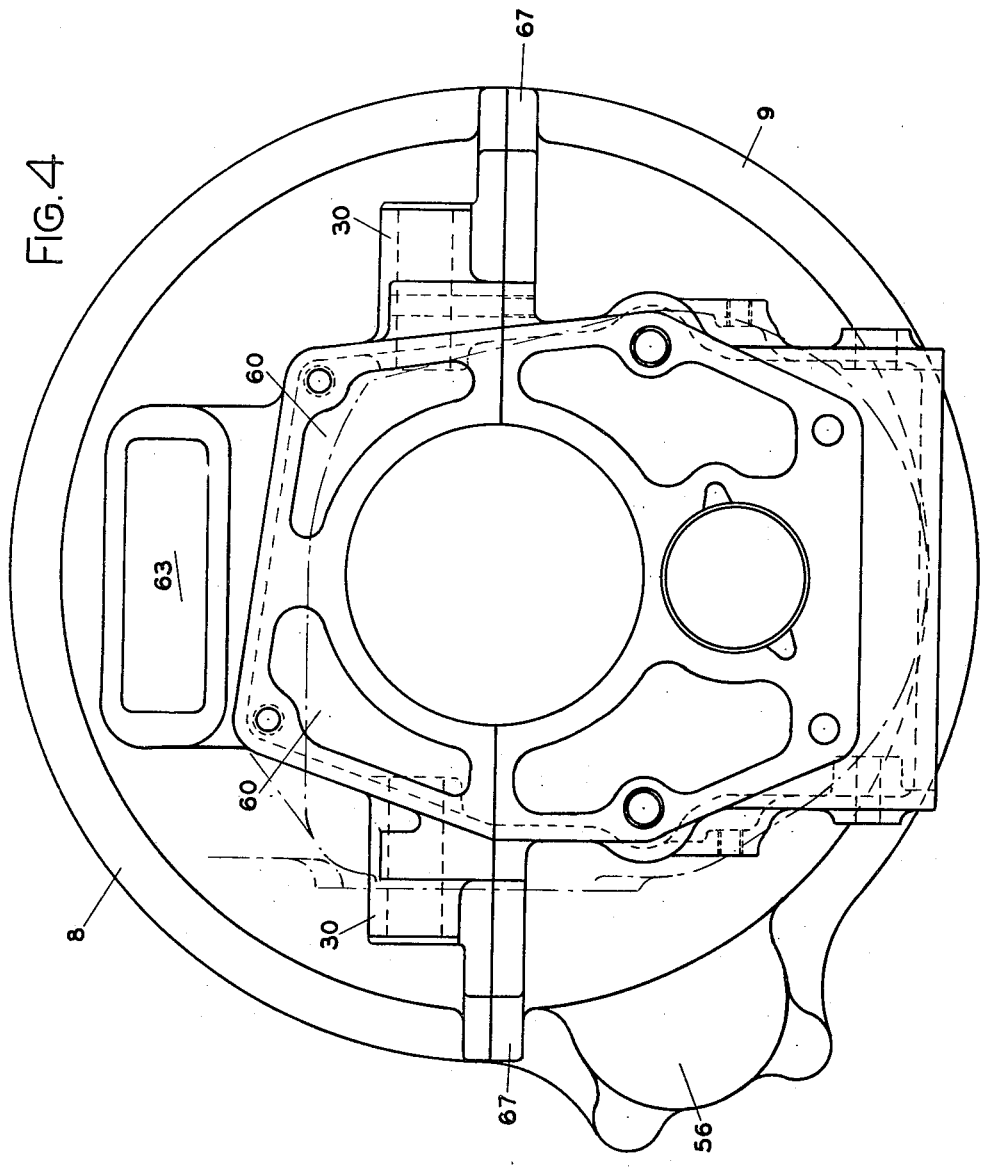
Figure 4 is a rear elevational view of the clutch housing shown in Figure 3.

Referring now in detail to the drawings, there is disclosed in Figure 1 an engine flywheel housing 5, within which is disposed the engine flywheel 6, having the starter gear 7 mounted thereon. Piloted on the flywheel housing 5 and extending rearwardly therefrom, is a clutch housing consisting of two parts 8 and 9 as more clearly shown in Figure 3. Bolted to the rear face of the clutch housing 8—9, is a transmission housing 10, adapted to enclose the transmission gearing associated with the vehicle.

Considering now the details of the mechanism within the clutch housing, there is provided the clutch plate 12, having a friction surface thereon and carried by the splined hub member 13, mounted upon a tubular sleeve 14 extending thereinto, and having an apertured radially enlarged flange 15 at the rear end thereof. Enclosing the clutch plate 12 and the clutch operating fingers, indicated diagrammatically at 16, is a clutch casing 17, which has a flange 18 bolted as by means of studs 19 to the flywheel 6. Disposed substantially in radial alinement with the rear face of the casing 17 is the clutch throwout bearing assembly 20, including the tubular forwardly projecting portion 22 of the clutch yoke assembly 23, shown more in detail in Figure 2, which is mounted upon the guide pins 24, carried by a semi-arcuate bracket 25 at the rear end thereof.

The yoke 23 is provided with the two ear portions 26, adapted to be engaged by the fingers 27 of the clutch operating arm 28, mounted upon the clutch shafts 29 secured in bosses 30, formed in the upper half 8 of the clutch housing. One of the shafts 29 extends laterally for engagement by a clutch pedal. The U-shaped clutch actuating arm 28 is secured on the shafts 29 by means of set screws 32 as shown clearly in Figure 3.

The bracket 25, which is semi-cylindrical in shape, is preferably secured within suitable apertures formed in the clutch housing 8—9 by being bolted by studs 33 through a bearing retainer 34, fitting within such opening, which retainer has additional studs 35 securing the lower portion thereof. This bearing retainer serves to retain the ball bearing assembly 36 for position in the forward end wall 37 of the transmission housing 10, thereby journaling the drive pinion gear 38 within this end wall.

The gear 38 has the portion thereof extending into the clutch housing provided with a splined flanged member 39, to which is bolted the flanged end 15 of the sleeve 14 as by means of bolts 40. Thus, the clutch plate 12 is tied directly through its hub and sleeve 14 to the gear 33 within the transmission housing through the connection of the bolts 40.

It will be noted that the member 39 has a pilot portion 42 mating with a similar pilot portion on the flange 15, for centering these two elements to provide co-axial drive therebetween.

Disposed within the sleeve 14 is a shaft member 43 which, at its forward end, is seated in the bearing assembly 44 formed within the flywheel member 6, thereby centering the sleeve 14 in the flywheel 6. The shaft 43, adjacent its opposite end, is provided with a grooved portion 45 which is adapted to be locked by means of the set screw 46, to prevent axial movement of the shaft relative to the sleeve. Beyond this grooved portion, the shaft is further provided with an annular groove 47, projecting slightly beyond the point at which the flange 15 of the sleeve 14 starts to form. A suitable wire or other means 48 serves to keep the screw 46 from loosening in position.

The transmission within the housing 10 is also provided with a counter shaft 50, extending forwardly through the end wall 37 and being journalled therein by means of the tapered bearing 52. Within the bottom clutch housing, the shaft 50 is provided with a brake drum portion 53, adapted to be engageable by a brake band 54 having suitable actuating mechanism, such as indicated at 55, to provide a service brake for the vehicle.

It will be noted that the housing which encloses the clutch casing 17 has an offset portion 56, which is adapted adapted to receive the starter motor for the vehicle, whereby the starter motor pinion can engage with the starter ring gear 7, carried by the flywheel. Also, it will be noted that the forward end wall 37 of the transmission housing is provided with suitable openings 60, formed therein to accommodate passage of oil to the bearings 36 and 52.

The clutch housing is also provided with an inspection opening 63, adapted to be covered by a plate to allow access to the clutch mechanism.

Considering now the manner in which the clutch may be removed from the housing 8—9, the first operation is removal of the cover plate over the inspection opening 63. Upon actuation of the clutch to clutch disengaged position, a suitable wood block, such as indicated at 64', may be inserted between the clutch casing 17 and the clutch fingers 16, thereby removing the pressure of the clutch springs upon the throw-out bearing assembly 20. This, in turn, allows this assembly to be moved forwardly to the dotted line position shown in Figure 1, thereby also allowing the clutch actuating yoke 26 to be similarly moved forwardly.

After the clutch has been disengaged, the upper half of the clutch housing, indicated at 8, is removed by removal of the studs which fasten the flange of this half to the flange 67 of the lower half 9. The studs securing the upper half of the clutch housing to the flywheel housing are also removed and the housing portion 8 is then removed, carrying with it the shafts 29 and the actuating arm 28. This provides ready access to bolts 33 which are then removed, thereby disassembling the bracket member 25 from the bearing retaining member 34. The remaining bolts 35 for this bearing retaining member need not be removed.

The next operation involves removal of the bolts 40 which connect the flange 15 to the flanged hub member 39, thereby disconnecting the sleeve 14 from the shaft 38. When this has been accomplished, it is only necessary to insert a suitable pry bar into the lateral opening 64 formed in the flanged portion 15 of the member 14, engaging the end thereof in the groove 47 of the shaft 43, first removing the set screw 46. A prying operation then results in moving the shaft 43 to the right, as viewed in Figure 1, out of the bearing assembly 44 and past the vertical plane of the end face of the flywheel housing 5. At the same time, this prying action forces the sleeve member 14 to the left, as viewed in Figure 1, removing therefrom the shouldered engagement between the shoulder 42 and the flanged member 15 to provide for clearance therebetween.

The upper half of the clutch housing 8 having already been removed, it is then only necessary to remove the studs 19 which fasten the clutch assembly to the flywheel and the entire assembly, including the bracket 25, the clutch throw-out bearing assembly, the sleeve 14, shaft 43, and the clutch assembly itself, can then be removed vertically.

It will be understood that the clutch operating fork arm 28, as well as the shafts 29 upon which it is mounted, are removed when the upper half of the clutch housing is removed, and consequently are out of the way when the clutch assembly is removed vertically out of the assembly. This allows for complete removal of the clutch and its associated parts for inspection, repair or replacement.

Reassembly of the mechanism is accomplished in a similar manner. The clutch casing 17, together with the sleeve 14 and shaft 43 in the position previously described, with the clutch throw-out bearing assembly mounted thereabout, are reinserted through the upper half of the housing which has been removed, and the clutch casing is again bolted to the flywheel by means of the studs 19. It is then necessary to relocate the flange 15 of the sleeve 14 with respect to the flanged hub member 39 of the shaft 38, and rebolt these elements together, forcing the shaft 43 to the left into the bearing assembly 44 and locking it in position by means of the set screws 46.

Figure 2:
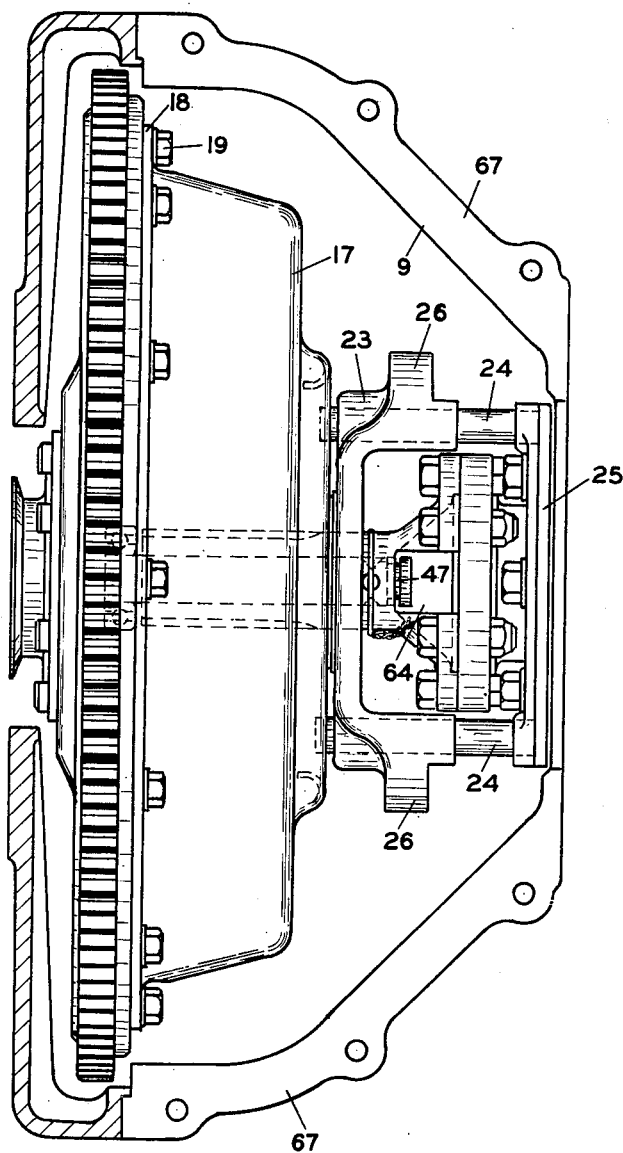
Figure 2 is a top view, partly in section, with the upper half of the clutch housing removed.

The clutch throw-out bearing assembly can then be repositioned by reclamping the bracket 25 to the bearing retainer element 34, after which the upper half of the clutch housing 8 is again placed in position and bolted down along the laterally expanding flange 67, shown in Figure 2, to complete the housing assembly. The operator need then only reach in through the inspection opening 63, and with the clutch thrown in, remove the blocks 64 and the mechanism is again ready for operation.

It will therefore be apparent that I have provided a novel type of construction within a clutch for allowing removal of the clutch unit vertically out of the clutch housing without requiring disassembly of the transmission or flywheel housing, and without requiring any arrangements necessitating removal of the transmission or any of the transmission shafts.

The present construction provides a quick and expeditious means for servicing clutches in vehicles of the type wherein the clutch is normally not accessible without the necessity of dismantling or disassembling any other portions of the vehicle.

I am aware that various changes may be made in certain details of the construction herein disclosed, and I therefore do not intend to be limited except as defined by the scope and spirit of the appended claims.

I claim:

1. A clutch construction including a pilot shaft journaled in a flywheel, a clutch plate sleeve encircling said pilot shaft, a transmission housing, a gear in said housing adapted to be driven by said sleeve, piloted means detachably connecting said gear to said sleeve, said sleeve and said pilot shaft being telescopically arranged whereby the overall axial length of said sleeve and said pilot shaft may be selectively decreased to provide for breaking of the piloted connection and for the withdrawal of said pilot shaft from its journaled position in said flywheel, thus freeing said mechanism for vertical movement.

2. In a construction comprising a flywheel and flywheel housing, a horizontally split clutch housing and a transmission housing in rigid end-to-end connection, a clutch mechanism supported on said flywheel including a clutch plate, a gear in said transmission housing having a portion extending into said clutch housing, a sleeve carrying said clutch plate and having direct detachable connection to said gear portion, a pilot shaft in said sleeve having a projecting end journalled in said flywheel, releasable means normally holding said shaft and sleeve against relative movement, and access means in said sleeve providing for relative movement of said sleeve and pilot shaft after detachment of said connection and release of said releasable means for freeing said mechanism for vertical movement, the upper portion of said clutch housing being removable.

3. In combination, a clutch assembly including a horizontally split clutch housing, a clutch actuating arm assembly carried entirely in the upper portion of said housing, a clutch casing enclosing a clutch plate, a pinion gear having a portion thereof extending into said housing, a sleeve carrying said clutch plate, piloted means within said housing detachably connecting said sleeve to the extending portion of said gear, a shaft within said sleeve and journaled at one end forwardly of said casing, said sleeve and said shaft being telescopically arranged whereby the overall axial length of said sleeve and said shaft may be selectively decreased to provide for breaking of the piloted connection and for the withdrawal of said shaft from its journaled position thus disposing the journaled end of said shaft within the axial extent of said casing.

4. In combination, a clutch assembly including a horizontally split clutch housing, a clutch actuating arm assembly carried entirely in the upper portion of said housing, a clutch casing enclosing a clutch plate, a pinion gear having a portion thereof extending into said housing, a sleeve carrying said plate and detachably connected within said housing to said extending portion of said gear, a shaft within said sleeve and journaled at one end forwardly of said casing, access means in said sleeve opening in line with the opposite end of said shaft, means on said opposite end of said shaft accessible through said access means providing for relative movement axially of said sleeve and shaft upon disconnection of said sleeve from said extending portion to provide for said sleeve lying within the axial extent of said housing, bearing retaining means for the extending portion of said gear mounted independently of said housing and retaining said gear in position when the upper portion of said housing is removed, and clutch throwout bearing means detachably supported on said retaining means and accessible for disconnection therefrom when said upper portion of said housing is removed.

5. In combination, a clutch assembly including a horizontally split clutch housing, a flywheel substantially co-planar with the forward end of said housing, a clutch casing peripherally secured to the face of said flywheel and enclosing a clutch plate, a gear outside said housing having a portion extending therein, sleeve means detachably inter-connecting said plate and gear within said housing, a clutch throwout bearing mounted axially on said sleeve, supporting means for said bearing detachably mounted about the extending portion of said gear independently of said clutch housing, a shaft journaled at one end in said flywheel supporting at least a portion of said sleeve means, and means accessible upon removal of the upper portion of said housing providing for disconnection of said sleeve means, axial withdrawal of said shaft from said flywheel and disconnection of said casing to permit withdrawal of said assembly vertically.

6. In combination, a flywheel housing, a flywheel therein, a clutch housing horizontally split and secured at its forward end to said flywheel housing, a transmission housing secured to the opposite end of said clutch housing, a gear in said transmission housing including a shaft portion extending into said clutch housing, a clutch casing secured to said flywheel, a clutch plate inclosed therein, sleeve means axially interconnecting said shaft portion and plate, a shaft supporting said sleeve means and journalled at one end in said flywheel, and clutch throw-out bearing means on said sleeve means, and means supporting said bearing means and detachably mounted on said transmission housing.

ROBERT LAPSLEY.

REFERENCES CITED

The following references are of record in the file of this patent:

UNITED STATES PATENTS

| Number | Name | Date |
|---|---|---|
| 1,171,341 | Huff | Feb. 8, 1916 |